Sept. 16, 1969  J. C. CROFT  3,467,143
PIPE SUPPORT
Filed Jan. 26, 1967

INVENTOR.
JOHN C. CROFT
BY *Watts, Hoffmann,
Fisher & Heinke*
ATTORNEYS

United States Patent Office 3,467,143
Patented Sept. 16, 1969

3,467,143
PIPE SUPPORT
John C. Croft, Barberton, Ohio, assignor to
New England Realty Co.
Filed Jan. 26, 1967, Ser. No. 611,955
Int. Cl. F16l 9/18, 9/14
U.S. Cl. 138—113                5 Claims

ABSTRACT OF THE DISCLOSURE

Pipe supports for spacing an inner pipe from an outer casing using one or more coil springs. A coil spring or springs engage the inner pipe or a protective sleeve around the pipe, and may be supported within an outer ring or may directly contact the outer casing. Insulated inner pipes are resiliently maintained spaced from the casing and there is little heat transfer between the pipe and casing through the supports.

BACKGROUND OF THE INVENTION

*Field of the invention.*—This invention relates to pipe supports, and more particularly to spring-type pipe supports for spacing an inner pipe from an outer casing and for retarding the transfer of heat between the two.

*Description of the prior art.*—Conduits comprising inner pipes and outer protective casings are well known, and find use in many applications. For example, insulated pipes in protective casings are used for underground conduits to conduct steam from a heating plant to adjacent buildings, such as buildings on school campuses or at government installations. Often the conduits used are prefabricated so that lengths of outer casings and inner pipes are assembled away from the installation site. These lengths of preassembled conduits are then connected at location during installation.

Various arrangements have been proposed for spacing an inner pipe from an outer casing to retard heat transfer between the two. One such support is disclosed in U.S. Patent No. 3,110,324 in which fiber strands are wrapped about an inner pipe and secured to a surrounding ring which is then located within an outer casing. Also, as disclosed in U.S. Patent 3,143,861, tension springs have been connected between a pipe and a casing to support the pipe. Wire type spacers that encircle an inner conduit and space it from a surrounding outer casing are also known, as shown by the U.S. Patents 2,020,860 and 2,915,089.

These known systems or devices for supporting pipes within outer conduits are not entirely satisfactory for use with prefabricated conduits, such as steam conduits that are prefabricated, connected at the site of installation, and buried in the ground, for a number of reasons. Strands that must be wrapped individually about an inner pipe and secured to an outer ring require individual and time consuming installation, since each is essentially fabricated at the time it is installed. Known wire-type spacers do not provide the necessary resilience or flexibility to adapt to different sized inner conduits and will not adapt to receive a plurality of pipes. Tension coil springs connected directly from an inner conduit to an outer casing are difficult to install and prohibit the sliding of the inner pipe into position within the outer casing. In addition, where the weight is suspended essentially from a single vertical coil spring at each location of suspension, uniform support is difficult.

SUMMARY OF THE INVENTION

The present invention is an improved pipe support that spaces an inner pipe from an outer casing. It provides a resilient support with excellent insulating properties and properly orients and locates the inner pipe within the outer casing. The pipe support is adapted to prefabrication and easy assembly of conduits and adjusts by virtue of its resiliency and design to a number of different sized inner pipes or outer casings, thus eliminating the need for stocking complete assemblies of supports for each pipe size. The resiliency also allows the pipe to expand and move in all directions while yet retaining the pipe centrally of the casing.

While this invention takes several forms, the present pipe support includes at least one coil spring in which individual coils are separated from each other to provide resilience and to minimize heat transfer. The coils are oriented so that central axes of individual coils lie in planes that are transverse to the pipe axis and casing axis. That is, no single coil surrounds the inner pipe. Rather, the coils as a group extend around or alongside the inner pipe, such that the central axes of the coils pass alongside of the pipe being supported, rather than in a direction that would pass transversely through the pipe. The arrangements utilize the ability of a coil spring to expand axially for resilience and to adjust for different sizes of pipes and conduits.

In one preferred embodiment, the pipe support is formed of two concentric rings, one an inner sleeve and the other an outer band. The two are spaced by a coil spring wrapped around the sleeve and bounded by the outer band. This support assembly can be positioned over the insulation of a pipe, and the pipe and support slid into an outer casing. The spring can expand or contract in length for use with pipes, casings, and rings of different diameters as long as the radial distance between the pipe and casing correspond generally to the coil diameter of the spring. Modified embodiments are also contemplated. For example, the spring can also be used without an inner or outer concentric ring, in which case it directly engages the inner pipe and the outer casing. If the inner pipe has an exposed layer of insulation, a sleeve is normally provided between the insulation and the spring for protection. Where the outer casing is corrugated and the spring directly contacts the casing, the spring is preferably flattened to extend across at least two corrugations to assure that the spring will slide within the outer casing.

In another preferred embodiment, a plurality of coil springs engage the outer surface of a protective sleeve or casing about an insulated inner pipe. The springs extend across a supporting band or ring that telescopes within an outer casing. The springs are secured at opposite ends to the band, preferably so that each is independently supported. These springs support an inner pipe that extends centrally of the supporting band. The springs, through expansion, facilitate various diameter insulated pipes and protective sleeves, and can be expanded to support two pipes, for example a supply and a return pipe. Thus, such a construction facilitates a variety of arrangements and pipe sizes, thereby reducing the number of pipe supports that must be fabricated and stocked, and also facilitates economic manufacture and rapid assembly since tolerances with respect to the inner pipe need not be maintained.

With the present pipe supports, a substantial air space is provided between the pipe and outer casing. The springs contact the inner pipe or a surrounding sleeve at only spaced locations and over only a short distance. Accordingly, heat transfer by convection or conduction is minimized. In fact, there is sufficient insulation and uniform dissipation of heat that hot spots cannot be detected along an outer casing in steam lines, as they can be with known concrete type pipe supports. The elimination of hot spots is important, because localized heat degrades protective coatings on the outer casings. Such coatings are normally used to prevent corrosion and otherwise protect a buried casing from the surrounding environment. In addition, the large open areas provided by the springs assures improved drainage of any water that accumulates in the casing due to condensation or leakage, and assures good circulation of air or other atmosphere within the casing. Also, this type of spring support absorbs shock and protects the inner pipe and insulation from damage which sometimes occur under adverse conditions of handling, as where a preassembled conduit length may be dropped during loading or unloading.

Axial sliding of the inner pipe relative to the spring type pipe support is facilitated by the small contact area between the springs and the inner pipe where the spring is in direct contact with the pipe or protective sleeve. This facilitates movement during expansion or contraction of the inner pipe and also facilitates assembly of the prefabricated conduit.

Accordingly, it is an object of this invention to provide improved spring-type pipe supports for supporting a pipe within an outer casing. Other objects, features and advantages of this invention will become apparent and a better understanding of the invention will be had by reference to the following detailed description, when considered in conjunction with the accompanying drawing.

DESCRIPTION OF THE PREFERRED EMBODIMENTS

Figure 1:
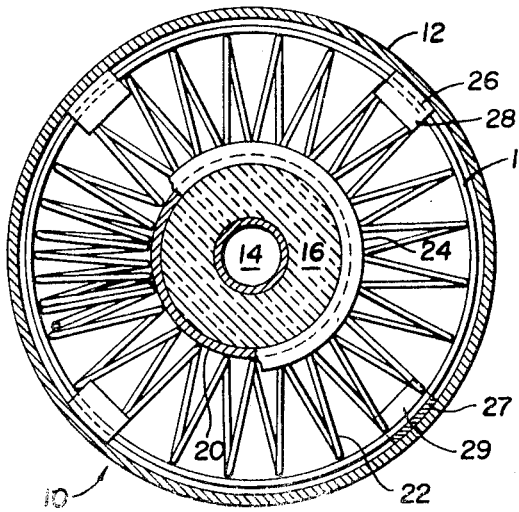
FIGURE 1 is an end elevational view of a conduit having an outer casing, inner insulated pipe and with a spring-type pipe support constructed in accordance with the present invention, having an inner sleeve and outer band.

A pipe support constructed in accordance with the present invention is indicated generally at 10 in FIGURE 1. As shown, the pipe support 10 is positioned within an outer tubular casing 12. The pipe support 10 surrounds an inner pipe 14 and a surrounding layer of insulation 16. A number of pipe supports are normally spaced along the pipe within a casing to support the pipe.

The pipe support 10 is formed of an outer band 18, a smaller diameter, concentric, sleeve or inner band 20, and a coil spring 22. The coil spring 22 surrounds the sleeve 20 and is surrounded by the outer ring 18. The coils 22 are in contact with the sleeve and outer band and maintain the two in spaced, concentric relationship. The sleeve 20, band 18 and spring 22 are of approximately equal dimensions axially of the casing 12, and extend only a short distance axially relative to the length of the casing and pipe, for example on the order of a few inches.

The inner ring or sleeve 20 is flanged or flared outwardly at opposite axial ends, to prevent the spring 22 from sliding off the sleeve. One end flange 24 is shown in FIGURE 1.

Four channel shaped brackets 26 extend across the outside surface of the band 18. Each bracket 26 includes a web portion 27 of a length equal to the width of the band 18, and two legs 28, 29 that extend radially inward to hold the coil spring 22 aligned with the band.

The construction of the pipe support 10 facilitates easy assembly, since the coil spring 22 in essence holds the inner sleeve 20 and outer band 18 together. Only the channel shaped retaining members 26 need be firmly adhered. These can be welded to the outer ring 18, or can merely be crimped tightly about the outer ring to maintain them in desired position. This pipe support is especially useful with pipes having an insulating layer 16 that is uncovered and hence which would be damaged by direct contact with the coils of the spring 22. When assembled, the sleeve 20 directly surrounds the insulation 16 and spreads the supporting forces from the coils of the spring 22 about a substantial area of the insulation.

Figure 2:
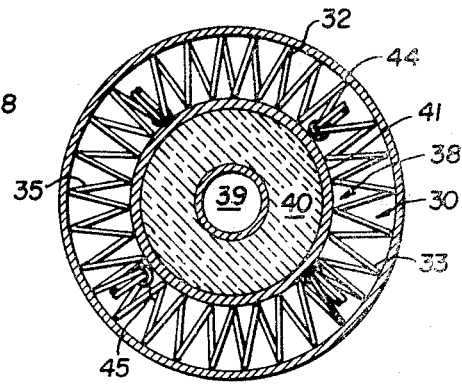
FIGURE 2 is a sectional view of an assembled conduit, showing an outer casing, an inner insulated pipe with a protective sleeve, and a plurality of connected spacing springs.

A second embodiment of this invention is shown in FIGURE 2 of the drawings. As shown, a pipe support 30 consists entirely of four separate coils springs 32–35 connected together at opposite ends and forming a continuous ring about an inner pipe assembly, indicated generally by reference numeral 38. In this embodiment, the inner pipe assembly 38 consists of an inner pipe 39, a layer of surrounding insulation 40, and an outer protective sleeve 41. The sleeve 41 can extend the length of the pipe 39 over the entire layer of insulation, or can be limited to an area adjacent the support 20. This inner pipe assembly 38 is spaced from an outer casing 44 by the connected coil springs 32–35, which are in direct contact with both the outer casing 44 and the concentric protective sleeve 41.

Most conveniently, the individual springs 32–35 are connected together by loops of wire 45, which may be in the form of a split ring or a wrapping of a number of strands. The ends of the springs can, of course, be otherwise connected if desired.

In the embodiments of FIGURES 1 and 2, the spring 22 or springs 32–35 expand or contract to accommodate to the size of the sleeve 20 or inner pipe assembly 38. Thus, the length of the springs is not critical. The distance between the inner pipe assembly and the outer casing is spanned by the diameter of the individual coils of the springs. A limited variation in radial distance between the inner collar 20 and band 18 or between the inner pipe assembly 38 and outer casing 44 can be tolerated. If the spacing is too small the individual coils of the springs are merely forced to a slight angle from a radial plane from the inner pipe, so that they are somewhat diagonally oriented (i.e., so that they lean a bit clockwise or counter clockwise in the orientation of FIGURES 1 and 2).

Figure 3:
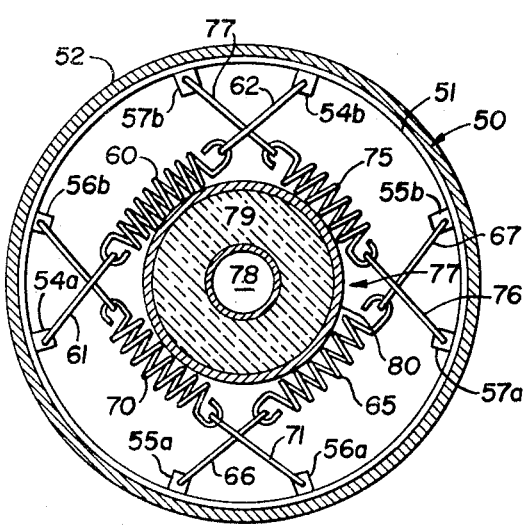
FIGURE 3 is a transverse sectional view of a conduit, showing another embodiment of a spring type pipe support having a ring or band and a plurality of coil springs independently supported across the band, and showing an inner insulated pipe and protective sleeve supported by the springs.
Figure 4:
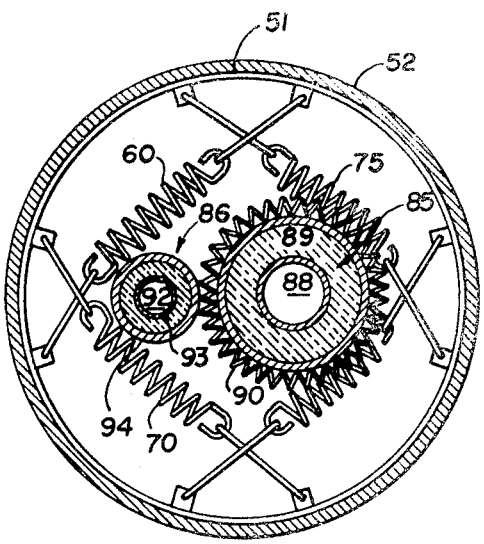
FIGURE 4 is an end elevation view of the pipe support of FIGURE 3, illustrating the manner in which a plurality of pipes can be supported, and showing a circumferential spring about one of the support pipes, separating adjacent pipes; and, FIGURE 5 is a diagrammatic longitudinal sectional view of an outer corrugated conduit showing an inner pipe and a modified spring type pipe support similar to that of FIGURE 1, but without the concentric inner sleeve and outer band.

Another spring-type pipe support 50 is shown in FIGURES 3 and 4 of the drawings. With reference to FIGURE 3, a supporting band 51 is provided that telescopes within an outer conduit casing 52. Four pairs of mounting tabs 54a, b; 55a, b; 56a, b; and 57a, b are secured to the inside surface of the supporting band 51 and extend radially inward. The tabs are arranged so that when the tabs of each pair are connected, the connecting elements will criss-cross, providing a central, generally square area.

Coil springs are connected across each pair of tabs. Thus, as shown, a coil spring 60, shorter than the distance between tabs 54a, 54b is connected at each end between those tabs by two connecting links 61, 62 that hook through openings in the tabs 54a, 54b, respectively. Similarly, a spring 65 is connected by links 66 and 67 between tabs 55a, 55b so as to be spaced from and essentially parallel to the spring 60. A coil spring 70 extending at essentially right angles to the springs 60 and 65 is connected by links 71, 72 to tabs 56a, 56b respectively, and spring 75 parallel and spaced from the spring 70 is connected by links 76, 77 to the tabs 57a, 57b.

An inner pipe assembly 77 extends through the space bounded by the four springs 60, 65, 70 and 75. As shown, the inner pipe assembly 77 includes an inner pipe 78, a layer of insulation 79, and a protective sleeve 80. The diameter of the pipe assembly 77 is somewhat greater than the normal distance between opposite parallel springs, so that when the inner pipe assembly 77 is located within the zone bounded by the springs, they will be forced to expand and move radially outward toward the supporting band 51. As a result, the inner pipe assembly 77 is held in a central position under the tension of the coil springs 60, 65, 70, 75. It will be readily apparent that the inner pipe assembly 77 could be of substantially larger diameter than that shown in FIGURE 3, and would be accommodated by further expansion of the springs.

The pipe support 50 as shown in FIGURE 4 can be used as a support for two inner pipe assemblies 85 and 86. The inner pipe assembly 85 includes a supply pipe 88, a surrounding layer of insulation 89, and a protective sleeve 90. In some assemblies the sleeve comprises a complete protective casing about the insulation. The inner pipe assembly 86 includes a return pipe 92, an insulating layer 93, and a protective sleeve 94. Both the supply pipe assembly 85 and the return pipe assembly 86 are located centrally within the band 51, bounded by the four springs 60, 65, 70, 75. These springs have expanded individually to the extent necessary to accommodate the two pipe assemblies. A space is maintained between the two inner pipe assemblies 85, 86 by an additional coil spring 96 that encircles the protective sleeve 90 of the supply pipe assembly and contacts the protective sleeve 94 of the return pipe assembly 86. The coil spring 96 is displaced axially from the transverse plane of the springs 60, 65, 70, 75.

Figure 5:
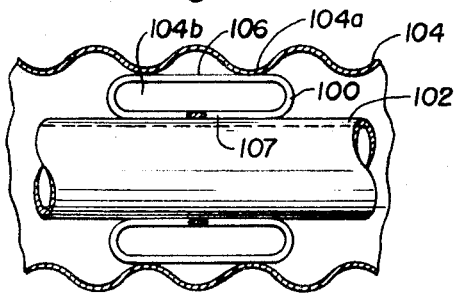

Another embodiment of this invention is shown in FIGURE 5 of the drawings. A continuous coil spring 100 surrounds an inner pipe 102 and spaces the pipe from an outer corrugated casing 104. The coils of the spring 100 are elongated axially of the pipe 102 and casing 104, to provide relatively flat outer portions 106 and inner portions 107. The length of the outer portions 106 is sufficient to extend from one corrugated portion 104a to the next adjacent corrugated portion 104b. This shape facilitates sliding the spring 100 relative to the outer corrugated casing 104 during assembly. As shown, the transverse or radial distance between the flat outer portion 106 and flat inner portion 107 of the spring 100 spans the distance between the outside surface of the pipe 102 and the inside surface of the casing as defined by the corrugations 104a, b. Except for the elongated configuration of the coils of the spring 100, it is otherwise constructed to continuously encircle the inner pipe 102, in the same manner that the spring 22 in FIGURE 1 encircles the inner ring 20 of the pipe support 10. While a pipe 102 without insulation is shown by way of example, the pipe could include a layer of insulation and a protective sleeve, as does the pipe 39 in FIGURE 2.

The springs disclosed herein are preferably formed of suitable corrosion resistant metal, such as stainless steel. The insulation shown is preferably continuous along the inner pipe. Alternatively, insulating sleeves can be provided around sections of the pipe between pipe supports, permitting direct support of the pipe by a spring type pipe support while yet insulating the pipe over most of the length.

While preferred embodiments of this invention have been disclosed in detail in the foregoing disclosure, numerous modifications or alterations may be made therein without departing from the spirit and scope of the invention.

What is claimed is:

1. A pipe support assembly slidable onto a pipe and into an outer casing for supporting a pipe within and spaced from an outer surrounding casing in a manner that retards heat transfer and allows circulation of the atmosphere within the casing, said pipe support assembly comprising a band adapted to encircle a pipe in spaced relation and to telescope within an outer casing that surrounds said pipe, and a plurality of lengths of coil spring means, each length secured to said band and extending in chord-like fashion at least partially across segments of the band, forming an open central area within the band adapted to slidably receive a pipe, said coil spring means engaging the pipe in generally tangential relationship.

2. The conduit of claim 1 wherein there are four coil springs arranged as spaced parallel pairs, one pair extending essentially at right angles to the other pair to engage the pipe at four different locations about the periphery.

3. The conduit of claim 1 including a second pipe within the outer casing and surrounded by the band, wherein the springs form a support about both pipes, and wherein a coil spring surrounds one of the two pipes to space the two pipes apart.

4. A pipe support assembly as set forth in claim 1 including four coil springs anchored at opposite ends to said band and extending thereacross to engage a pipe at four different locations about the periphery thereof.

5. A pipe support assembly slidable onto a pipe and into an outer surrounding casing for supporting a pipe within and spaced from an outer surrounding casing in a manner that retards heat transfer and allows circulation of the atmosphere within the casing, said pipe support assembly comprising an inner sleeve constructed to surround a pipe, an outer concentric band constructed to telescope within an outer casing, first flange means extending radially outwardly of said sleeve, second flange means extending radially inwardly of said band, and coil spring means encircling said inner sleeve and surrounded by said outer band and spacing the two apart, said sleeve, spring means and band being held in assembled concentric relationship by said first and second flange means.

References Cited

UNITED STATES PATENTS

| 2,142,542 | 1/1939 | Wallach | 138—115 |
| 2,934,096 | 4/1960 | Banks | 138—111 |
| 3,110,324 | 11/1963 | De Haan | 138—114 XR |
| 3,143,861 | 8/1964 | Dumas | 138—113 XR |
| 3,213,889 | 10/1965 | Cotman | 138—113 |

ROY D. FRAZIER, Primary Examiner

J. F. FOSS, Assistant Examiner

U.S. Cl. X.R.

138—148; 248—54, 358